INVENTOR.
JAMES C. GREENLEES, JR.

INVENTOR
JAMES C. GREENLEES, JR.

United States Patent Office 3,004,526
Patented Oct. 17, 1961

3,004,526
PRESSURE CONTROLLED POSITIONER
James C. Greenlees, Jr., Oakdale, N.Y., assignor to Fairchild Stratos Corporation, a corporation of Maryland
Filed Nov. 20, 1958, Ser. No. 775,184
5 Claims. (Cl. 121—41)

This invention relates to a pressure controlled positioner for regulating the position of a control element in response to a control signal. The pressure controlled positioner of the present invention is particularly suited for use as a valve positioning device.

In the pressure controlled positioner of the present invention, a relatively high pressure supply is provided to re-position the adjustable control element from a position of equilibrium. This pressure supply is also available to maintain the control element in, or restore it to, the new position of equilibrium, thereby imparting a high degree of stability to the control element. Notwithstanding the inherent stability of the actuator, the re-positioning of the control element is practically instantaneous in response to relatively small variations in a control pressure.

The pressure controlled positioner of the present invention is characterized by linearity between the control signal and the positioning of the control element over a considerable range of operation, which linearity is not affected by small fluctuations in the relatively high supply pressure. A supplemental feature of the positioner is that it is designed for both direct and reverse action.

Figure 1:
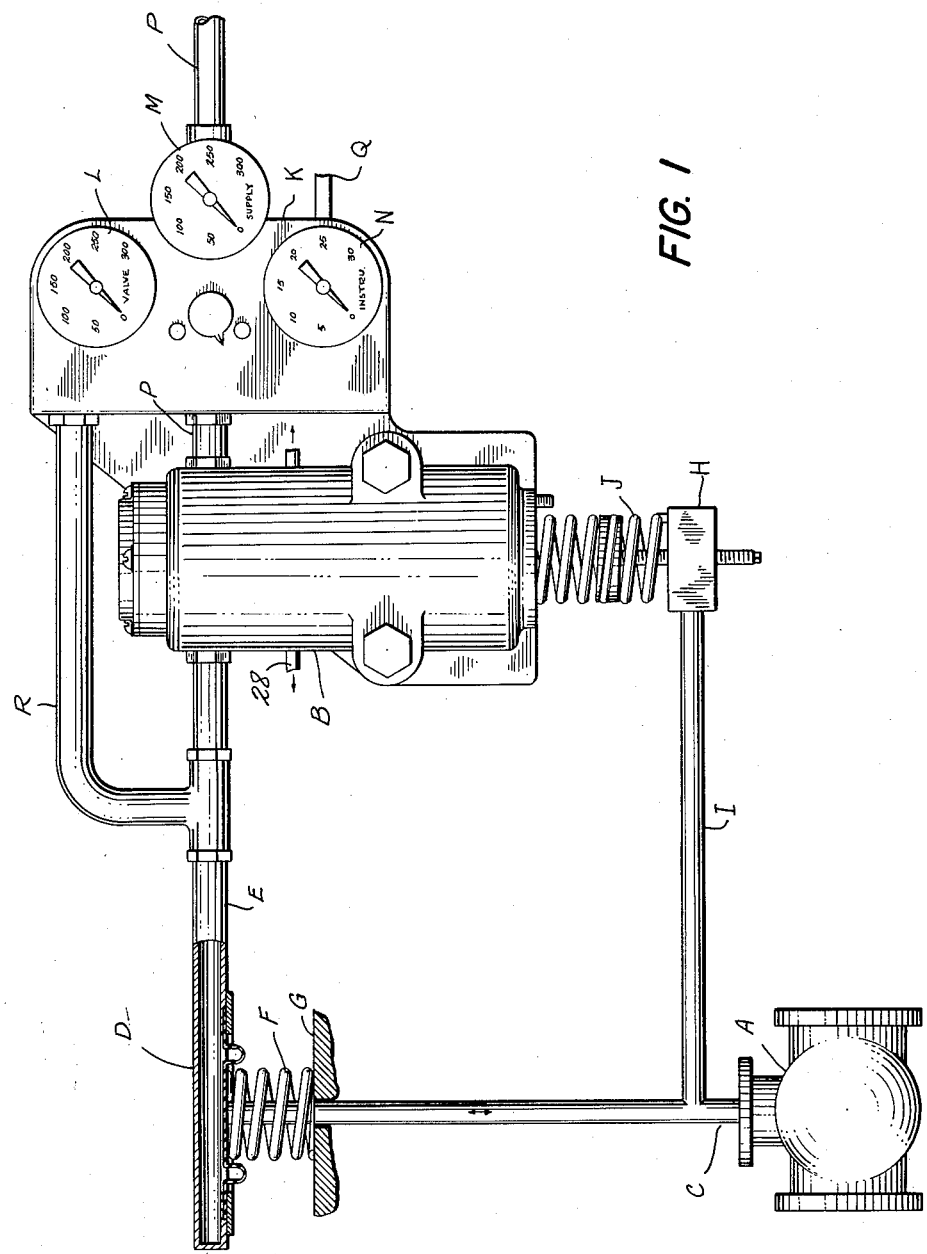
Figure 2:
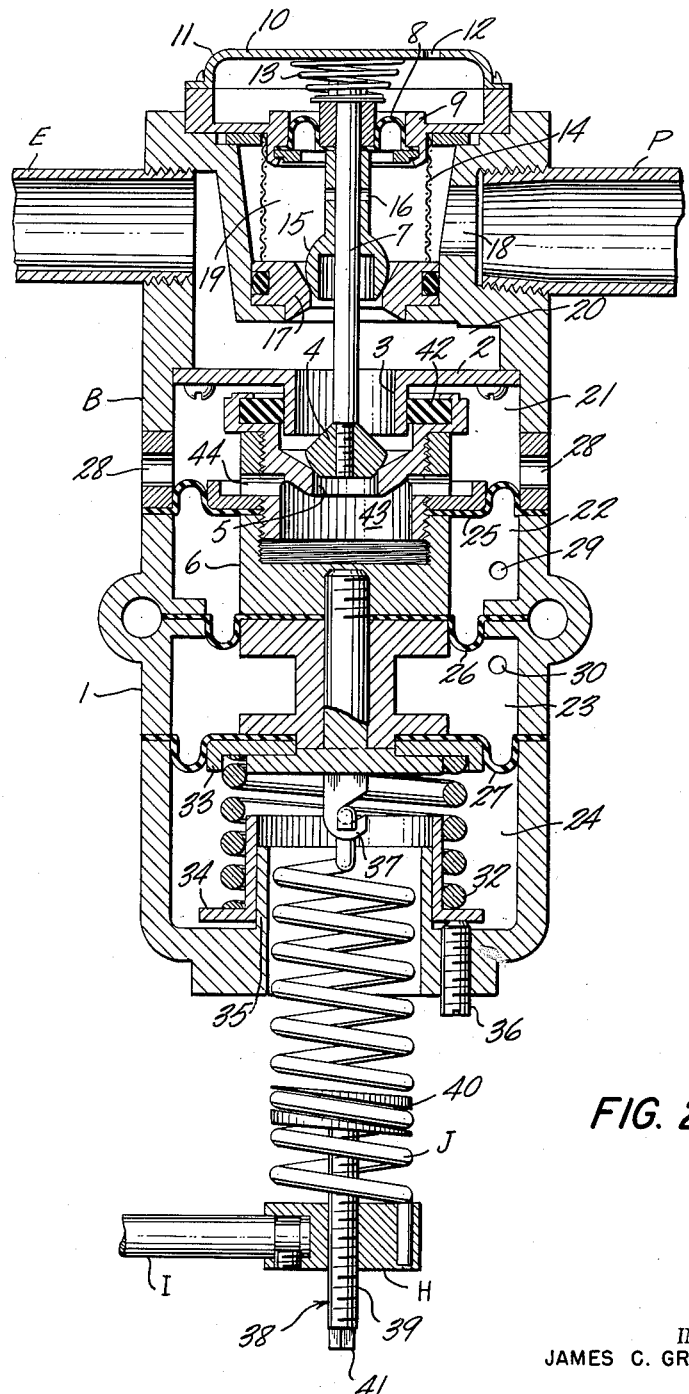

For a complete understanding of the invention, reference may be made to the detailed description which follows, and to the accompanying drawings, in which:

FIGURE 1 is an elevational view of a system in which the pressure controlled positioner of the present invention functions as a valve positioner, with parts of the system broken away and shown in cross-section; and FIGURE 2 is an elevational view in cross-section of the pressure controlled positioner proper.

In the system illustrated in FIGURE 1 of the drawings, the control element is a valve housed within a section of a conduit, designated by the reference character A, and the position of the valve is regulated by the pressure controlled positioner B. The valve is equipped with a valve stem C which is connected at its upper end to a flexible pressure controlled diaphragm D, the movable positioner means for the valve and valve stem C. The diaphragm D, in turn, is in communication with the valve positioner B through a conduit E. The position of the diaphragm D is influenced by the pressure transmitted to the upper surface of the diaphragm through the conduit E and by the force of a compression spring F which acts in opposition thereto. The spring F is accommodated on the valve stem C and acts between a fixed reference surface G and the underside of the diaphragm.

The valve stem C is connected to a spring-retaining member H by an extension arm or rod I. An extensible spring J connects the spring-retaining member H with a movable element of the valve positioner. It is apparent that as the valve stem C is displaced from an adjusted position by a change in pressure transmitted to the diaphragm D, the spring-retaining member H will be similarly displaced, varying the force exerted by the spring J. As will be explained more fully below, this is a feedback action which is transmitted to the valve positioner B to help move or restore it to a position of equilibrium following a displacement in the position of the valve.

An instrument panel K supports thereon pressure indicating gauges L, M and N. A fluid, for example air, at a relatively high constant pressure is supplied to the valve positioner B through a conduit P from a suitable source. The value of this pressure can be checked by reference to the gauge M. A substantially lower control pressure is supplied to the valve positioner B through a conduit Q. It is the variation in the control pressure which controls the position of the valve and its valve stem C. Its value is indicated by the gauge N. The value of the pressure in the conduit E is indicated by the gauge L, the pressure being transmitted thereto by the conduit R.

Turning now to FIGURE 2 of the drawings, the components of the valve positioner B are accommodated within a housing 1. The housing 1 is divided into upper and lower parts by a partition wall 2 which has a central opening 3 therethrough. The upper end of the housing contains actuating means for controlling the position of a valve 4, and the lower portion of the housing contains actuating means for positioning a valve seat 5 relative to the valve 4. The valve seat 5 is part of an assembly 6 which moves as a unit.

The valve 4 is threaded to the lower end of a valve stem 7. The upper end of the valve stem 7 is connected to a flexible pressure controlled diaphragm 8 which serves as an actuator for the valve 4. The outer periphery of the flexible diaphragm 8 is affixed to an annular support 9 fitted in the upper end of the housing 1. A cover 10 is secured to the upper edge of the annular support 9, forming a chamber 11 above the flexible diaphragm 8. The chamber 11 is vented to atmosphere by an opening 12 in the cover. The chamber 11 accommodates a tapered compression spring 13 therein which exerts a downward force on both the valve 4 and the diaphragm 8.

The valve stem 7 supports thereon a valve 15 immediately below the diaphragm 8. The valve 15 is fixedly positioned on the valve stem 7 by means of a pin 16. The valve 15 is movable with respect to a fixed valve seat 17.

The compressed spring 13 urges the valve 15 to closed position against the valve seat 17. However, the fluid under relatively high pressure is supplied from the conduit P through the port 18 into the chamber 19 intermediate the valve 15 and the diaphragm 8, lifting the valve 15 from its seated position and permitting flow of the fluid into a lower chamber 20 which is in communication with the conduit E. The chamber 19 contains a cylindrical filtering screen 14 through which the fluid passes in flowing from the port 18 to the chamber 20. The pressure in the chamber 20 is transmitted to the movable diaphragm D, determining the position of the valve to be regulated.

The lower portion of the housing 1 below the wall 2 is subdivided into a plurality of chambers 21, 22, 23 and 24 by the flexible diaphragms 25, 26 and 27. The outer peripheries of the diaphragms 25, 26 and 27 are affixed to the housing 1, and the inner peripheries thereof are affixed to the movable valve seat unit 6.

The chamber 21 is vented to atmosphere through the ports 28. The chamber 22, hereinafter sometimes referred to as a control pressure chamber, communicates with the control pressure conduit Q through a port 29, and it is the variation in pressure within this chamber which exerts the control over the pressure in communication with the diaphragm D in the re-positioning of the valve stem C and the valve connected thereto. In this particular application of the present invention, the chamber 23, also hereinafter sometimes referred to as a control pressure chamber, is vented to atmosphere through a port 30. Similarly, the lower chamber 24 is open to atmosphere.

The effective area of the diaphragm 25 exposed to the fluid in the control pressure chamber 22 is greater than the effective area of the diaphragm 26 exposed to the fluid in the same chamber. For reasons which will be explained below, the effective area of the diaphragm 27 exposed to the chamber 23 is equal to the effective area of the diaphragm 25 exposed to the chamber 22 and greater than the effective area of the diaphragm 26 exposed to the chamber 23, the effective areas of the diaphragm 26 exposed to the chambers 22 and 23 being equal. Therefore, it is apparent that the control pressure within the chamber 22 will exert a net upward force on the movable valve seat unit 6.

The chamber 24 accommodates therein a compressed spring 32 which acts between a spring-retaining disc 33 adjacent the flexible diaphragm 27 and an adjustable spring-retaining member 34 which is guided for sliding movement on an upstanding annular portion 35 of the housing 1. The position of the spring-retaining member 34 is adjusted by the adjustment of a set screw 36. Thus, the adjustment of the set screw regulates the upward force exerted by the spring 32 on the diaphragm 27 and the movable valve seat unit 6, counterbalancing the downward force exerted on the valve seat unit by the pressure in the chamber 20.

The lower end of the movable unit 6 is provided with a hook element 37 which depends downwardly therefrom. The upper end of the spring J is connected to this hook element. A T-shaped adjusting member 38 is provided to permit the effective length of the spring J to be varied. The member 38 has a shank 39 which is threaded through the block H and a head 40 having a groove around its outer periphery for receiving a loop of the spring. The groove is in a plane diagonal to the axis of the shank 39 to afford a threaded relationship therebetween. The extreme lower end of the shank 39 is of non-circular configuration, so that the member 38 may be adjusted upwardly to shorten the effective length of the spring, or downwardly to increase the effective length of the spring.

The upper end of the movable valve seat unit 6 carries a seal 42 which slidably engages the outer periphery of the downwardly depending portion of the wall 2 which defines the central opening 3 therethrough. This seal permits movement of the unit 6 under the influence of a force balance system independently of the movement imparted to the valve 4, while at the same time isolating the chambers 21 and 22.

The relative position of the valve 4 and the valve seat 5 determines the rate of bleed from the chamber 20. This bleed flows from the chamber 20 into a bore 43 within the movable unit 6. The bore 43, in turn, is connected by means of ports 44 to the chamber 21 which, as explained above, is open to atmosphere.

In operation, the adjustment of the valve stem C from a position of equilibrium is controlled by a variation in the pressure transmitted to the movable diaphragm D. This pressure, in turn, is regulated by a variation in the control pressure within the chamber 22. By way of illustration, when the system is in balance and the control pressure increases within the chamber 22, the valve seat unit 6 will be displaced upwardly because of the greater effective area of the diaphragm 25 in comparison with the effective area of the diaphragm 26. This upward movement of the unit 6 moves the valve seat 5 upwardly, diminishing the bleed to atmosphere from the chamber 20 through the passage defined between the valve 4 and the valve seat 5. This action increases the pressure within the chamber 20, and this increase in pressure is transmitted to the movable diaphragm D through the conduit E, moving the valve stem C downwardly by an increment which corresponds with the increase in the pressure signal in the control pressure chamber 22. Equilibrium is restored to the system when the valve stem C has been re-positioned through the feedback pressure transmitted to the unit 6 through the rod I, the block H and the spring J. More specifically, the downward movement of the valve stem C moves the block H downwardly inasmuch as the block H is connected to the valve stem by the rod I. This action will extend the spring J, thereby increasing the force exerted on the movable unit 6 in the new position of equilibrium so that a small displacement of the valve seat unit 6 can be translated into a greater displacement of the valve stem C. Moreover, the spring J exerts a force on the valve stem unit which tends to restore it to the desired position of equilibrium in the event it is displaced therefrom by forces other than those produced by variations in the control pressure.

If, on the other hand, the control pressure in the chamber 22 is reduced by a given increment, the unit 6 will move downwardly in response to the pressure signal, increasing the gap between the valve 4 and the valve seat 5. The increase in the size of this passage will permit a greater bleed to atmosphere from the chamber 20, thereby diminishing the pressure within the chamber 20. The diaphragm D reacts to this decreased pressure in the chamber 20, displacing the valve stem C upwardly. The upward displacement of the valve stem C, in turn, is transmitted to the block H, causing a reduction in the force exerted by the spring J on the unit 6, which will bring the assembly 6 to a new position of equilibrium corresponding to the control pressure in the chamber 22.

Small fluctuations in the pressure of the fluid supplied by the conduit P will not affect the operation of the pressure controlled actuator. As explained above, this fluid is supplied from the conduit P to the chamber 20 through the valve 15 which is urged toward closed position against its valve seat 17 by the spring 13. This valve, however, is held open by the force exerted on the diaphragm 8 by the pressure built up in the chamber 19. If, therefore, the supply pressure should fluctuate upwardly, the increase in pressure upstream of the valve 15 would exert a greater force on the diaphragm 8, increasing the effective size of the passage between the valve 15 and the valve seat 17. This increase in pressure also moves the valve 4 upwardly away from its valve seat 5, increasing the rate of bleed to atmosphere and preventing the fluctuation in supply pressure from producing a pressure variation within the chamber 20. In similar fashion, if the supply pressure should decrease in value, the valves 4 and 15 would be displaced toward their respective valve seats, diminishing the supply of fluid to the chamber 20 and the rate of bleed therefrom so as to maintain the pressure within the chamber 20 substantially constant.

The action of the pilot valve positioner can be reversed, if desired, by connecting the control pressure conduit Q with the port 30 and venting the port 29 to atmosphere. When the chamber 23 is used in this way to control the operation of the valve stem C, an increase in the control pressure will displace the movable unit 6 in a downward direction, and a decrease in the control pressure will displace the unit 6 in an upward direction.

The invention has been shown in preferred form and by way of example only, and obviously many variations and modifications may be made therein without departing from the spirit of the invention. The invention, therefore, is not to be limited to any specified form or embodiment, except insofar as such limitations are set forth in the claims.

I claim:

1. A pressure controlled positioner comprising a housing, a plurality of movable walls within the housing defining a plurality of chambers, including a control pressure chamber and a vented chamber, the control pressure chamber having a port for introducing therein a control fluid and the vented chamber having a port through which fluid is discharged, a movable pressure controlled positioner, a passage communicating with the interior of the housing and through which variations in pressure are translated to the pressure controlled positioner for the regulation thereof, means connecting the interior of the housing with a source of fluid under relatively constant pressure, relatively movable valve and valve seat elements within the housing, the relative positions thereof regulating the flow of said supply fluid to the vented chamber which, in turn, regulates the pressure transmitted through said passage to the pressure controlled positioner, a pressure controlled actuator in communication with the supply pressure and connected to one of said elements for regulating the position thereof to compensate for variations in the supply pressure, and a movable control member connected to said movable walls and to the other of said elements for regulating the position thereof, whereby a variation in the pressure within the control pressure chamber produces displacement of the movable control member to vary the relative positions of the valve and valve seat elements which, in turn, regulates the pressure transmitted to the pressure controlled positioner.

2. A pressure controlled positioner as set forth in claim 1 including an alternate control pressure chamber which is defined in part by one of the movable walls which controls the position of the control member, said alternate control pressure chamber having a port which serves as a vent when the first-mentioned control pressure chamber is in communication with the control fluid, the movable wall which in part defines the alternate control pressure chamber being reverse acting on the control member when the port thereof is in communication with the control fluid and the port of the aforesaid control pressure chamber is vented.

3. A pressure controlled positioner as set forth in claim 1 including a feedback connection between the pressure controlled positioner and the movable control member, said feedback connection including a yieldable element which imposes a restoring force on said movable control member when the control member is not in equilibrium.

4. A pressure controlled positioner comprising a housing, a plurality of movable members within the housing defining a plurality of chambers, said chambers including a control pressure chamber and a vented chamber, a movable valve, a movable valve seat connected to said movable members so as to be positioned thereby, means for introducing a fluid under pressure to the upstream side of said valve, the downstream side of said valve being in communication with said vented chamber, movable pressure controlled positioner means, a passage connecting the upstream side of the valve with the movable positioner means, whereby variations in the pressure within the control pressure chamber produces displacement of the movable valve seat to vary the relative positions of the valve and valve seat for regulating the pressure transmitted to the pressure controlled positioner means, and actuating means controlled by the pressure upstream of the valve for controlling the position of the valve to compensate for variations in the pressure of the fluid supplied to the upstream side of the valve, said actuating means including a stationary valve seat, a valve connected to said above-mentioned valve and movable relative to said stationary valve seat, and a movable diaphragm connected to both of said valves and in communication with the fluid under pressure which is introduced into the housing on the upstream side of said valve.

5. A pressure controlled positioner comprising a housing, a plurality of movable walls within the housing for defining a plurality of chambers therein, said chambers including a pressure control chamber and a vented chamber, a movable control member connected to said movable walls so as to be positioned thereby, relatively movable valve and valve seat elements, means for introducing a fluid under pressure to the upstream side of said valve element, the downstream side of said valve element being in communication with said vented chamber, movable pressure controlled positioner means, a passage connecting the upstream side of the valve with the movable positioner means, and actuating means controlled by the pressure upstream of the valve element, said control member displacing one of said valve and valve seat elements and said actuating means displacing the other, whereby variations in the pressure within the control pressure chamber produces displacement of one of the valve and valve seat elements to vary the relative positions thereof for the purpose of regulating the pressure transmitted to the pressure controlled positioner means, and variations in the pressure of the fluid supplied to the upstream side of the valve element are compensated for by a variation in the relative positions of the valve and valve seat elements.

References Cited in the file of this patent

UNITED STATES PATENTS

| | | |
|---|---|---|
| 2,638,922 | Caldwell | May 19, 1953 |
| 2,649,714 | Griffith | Aug. 25, 1953 |
| 2,743,735 | Du Bois | May 1, 1956 |
| 2,755,812 | Garnett | July 24, 1956 |
| 2,770,246 | Shafer et al. | Nov. 13, 1956 |